Feb. 3, 1942.   G. P. HAYNES   2,271,587
AIR REGISTER
Filed June 26, 1940   3 Sheets-Sheet 2
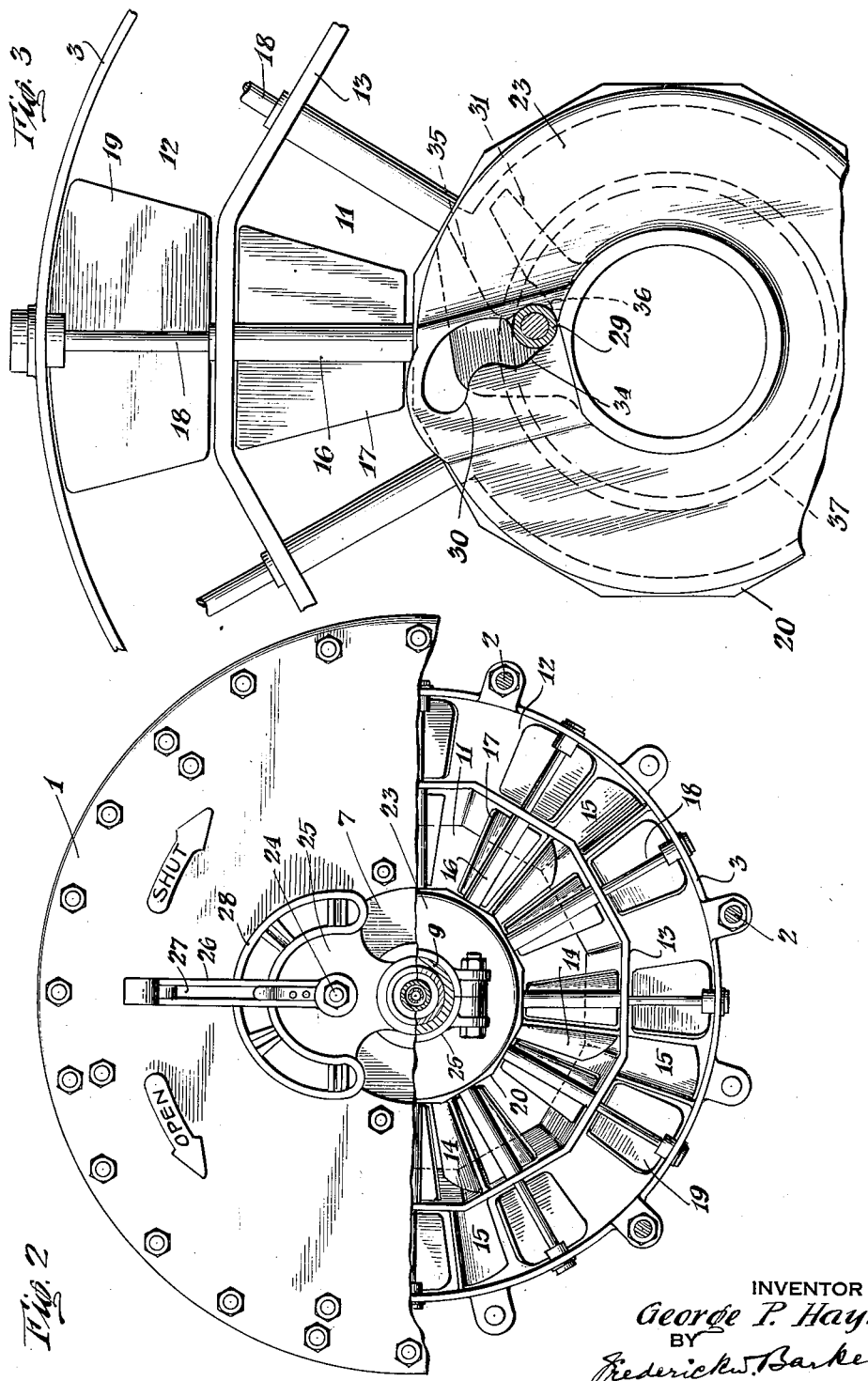
INVENTOR
George P. Haynes
BY
Frederick T. Barker
ATTORNEY Feb. 3, 1942.  G. P. HAYNES  2,271,587
AIR REGISTER
Filed June 26, 1940  3 Sheets-Sheet 3
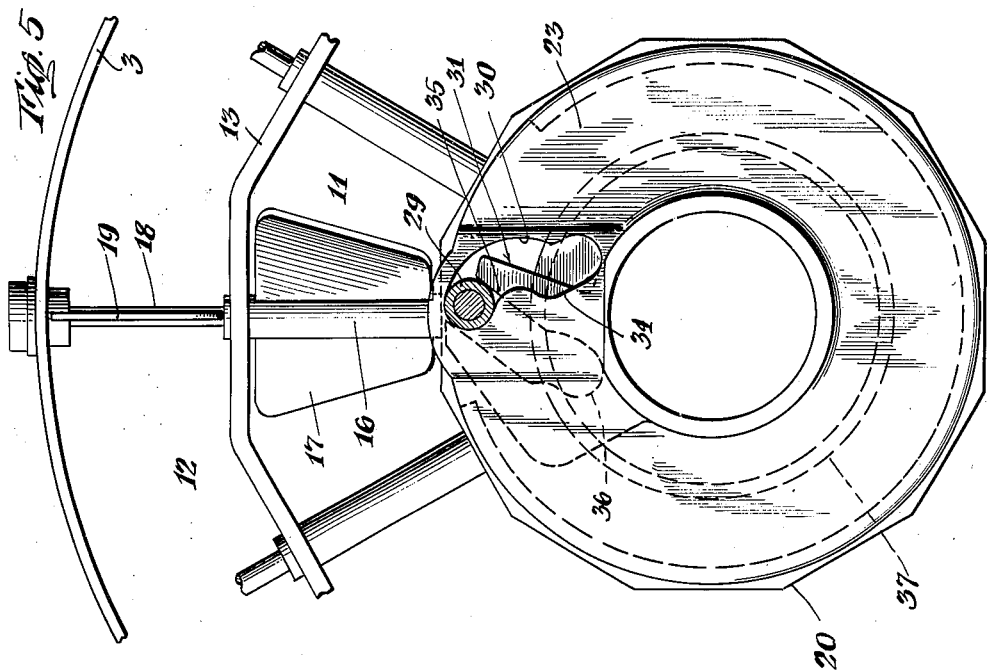
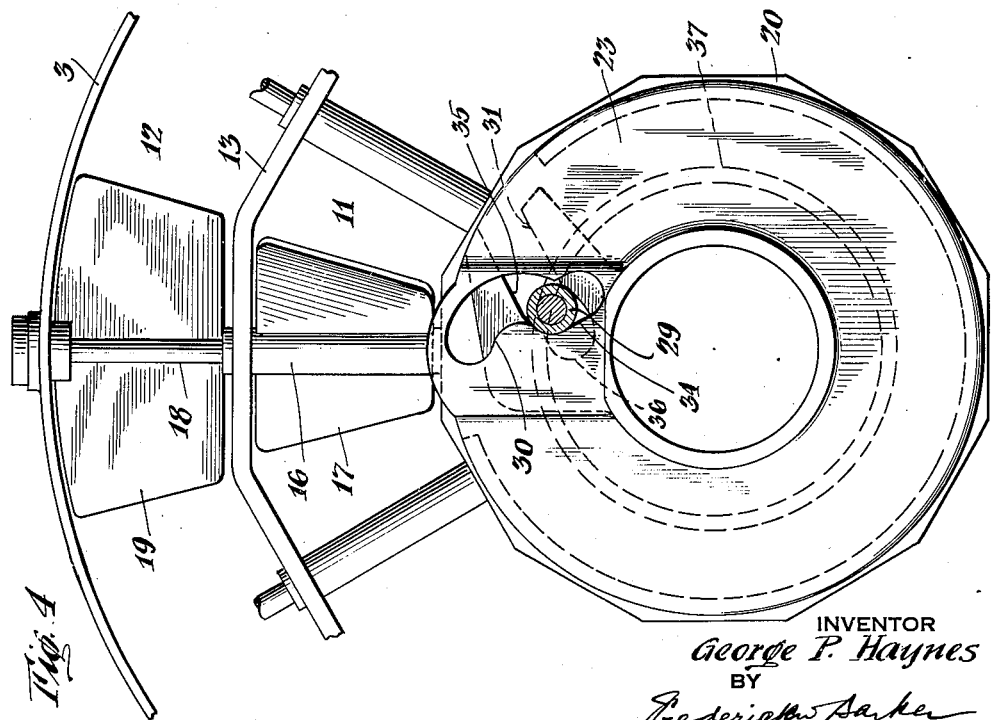
INVENTOR
George P. Haynes
BY
Frederick W Barker
ATTORNEY Patented Feb. 3, 1942

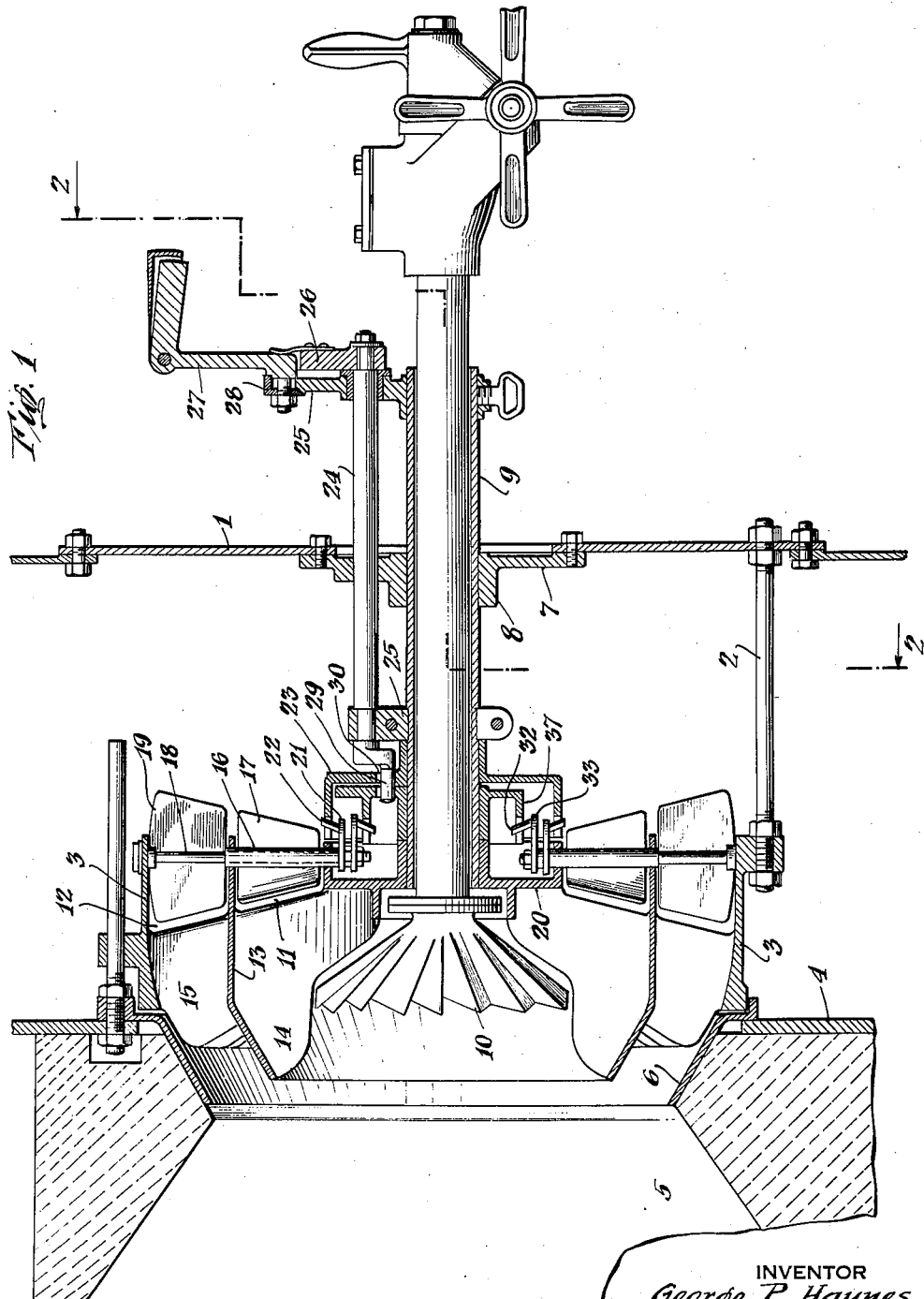

2,271,587

UNITED STATES PATENT OFFICE 2,271,587

AIR REGISTER

George Perry Haynes, Rockville Centre, N. Y., assignor to Todd Combustion Equipment, Inc., New York, N. Y., a corporation of New York Application June 26, 1940, Serial No. 342,432

14 Claims. (Cl. 158—1.5)

This invention relates to registers for the controlled delivery of air, in variable quantities, to furnaces that are equipped with liquid fuel burners which may be of variable capacity, or provided with standard atomizers.

With variable capacity burners, such for example as those described in Patents Nos. 2,177,780 and 2,177,781, it is desirable that simple, easily operable, and efficient means be provided for regulating the air intake in order that the complementary quantity of air may be admitted to support combustion with respect to the amounts of liquid fuel that are atomized and introduced into the furnace.

In carrying out this concept there is provided in addition to the use of fixed, angular vanes in the register, located respectively in concentric, Venturi-like passageways in the register body, other sets or series of vanes which sets are each adjustable to regulate the quantity of air that is permitted to pass through the respective passageways.

To simplify the quantity control of admitted air the vanes located in the inner concentric passageway are to be opened ahead of the opening of the vanes in the outer concentric passageway and serve to admit the minimum quantity of air for admixture with and combustion of the relatively small quantity of liquid fuel that is permitted to become atomized and to enter the furnace, as for idling or minimum load purposes.

As larger quantities of liquid fuel are to become atomized beyond the combustion supporting capacity of the air admitted past the vanes in the inner concentric passageway, then the vanes in the outer concentric passageway are also to be opened to supply the additional complementary quantity of combustion supporting air.

In an example of operating means for the vanes, each vane in the inner concentric passageway may be carried by an individual sleeve, while the companion vane in the same radius in the outer concentric passageway is carried by a shaft that is passed through said sleeve. Control means are provided for operating the vane carrying sleeves and shafts, said control means in operation causing the inner vane to open first and by continued movement causing the outer vane to open.

To shut the vanes the operation of the control means is reversed, whereupon the outer vanes are caused to close before the closing of the inner vanes.

The respective sets of inner and outer vanes may be angled oppositely, as are the respective inner and outer fixed vanes, to accord opposite rotation of the air streams flowing through the respective inner and outer concentric passageways.

Other features and advantages of my invention will hereinafter appear.

In the drawings:

Figure 1 is a side sectional view of an air register, as applied to a furnace, shown as equipped with my improved dual air supply means, for the introduction of variable quantities of air complementary to means for supplying variable quantities of liquid fuel to the furnace.

Fig. 2 is a front view of a boiler casing with which the register is connected, this view being partly in section, to disclose the fixed and movable vanes.

Fig. 3 is an enlarged detail view showing a portion of the inner and outer concentric passageways, with a radial pair of vanes, one in each passageway, both vanes being in the closed position, and means for operating said vanes. Fig. 4 is a similar view but showing the inner vane open, and Fig. 5 is a similar view showing the outer vane also open.

In said views let 1 indicate the outer casing of a boiler, which is connected as by tie bolts 2 with a register body 3 that itself connects rearwardly with the boiler front 4. The furnace opening is indicated at 5, and is preceded by the usual throat ring 6. The closure plate 7, which is fitted in the outer casing 1, is provided with a centre piece 8 that forms a support for the jacket tube 9 of the liquid fuel burner, which latter is provided with a diffuser 10.

For a consideration of the particular burner which may for example be used with the air register which is the subject of the present invention, reference is made to the variable capacity burner that is described and illustrated in Patents Nos. 2,177,780–1, these patents relating to a liquid fuel burner and atomizer wherein the atomized fuel is subjected to constant pressure under all conditions of variable quantity delivery.

Equally, the present improved air register, because it is capable of delivering variable quantities of air, to support fuel combustion, may be employed with other liquid fuel burners of standard or variable fuel delivery capacity.

The register, whose body portion is indicated at 3, contains inner and outer concentric, Venturi-like passageways, whereof the inner passageway is indicated at 11 and the outer one at 12. These passageways are separated by a concentric wall 13.

In the inner passageway 11 are positioned fixed vanes 14, angled to give a rotating movement to air flowing through said passageway, and in the outer passageway 12 are positioned fixed vanes 15, angled to give rotating movement to air flowing through said outer passageway. The fixed vanes in the inner and outer passageways preferably have opposite angularity so that air will be caused to flow in oppositely rotating directions into the furnace.

Also in the respective inner and outer passageways are placed vanes or doors which control the flow of air through said passageways. These vanes are in series or sets that extend around the respective passageways and are carried by radial shafts whereof each shaft carries an inner vane and an outer vane, said shafts each being journalled in the register body 3 and the wall 13. Since each shaft is intended to operate both an inner vane and an outer vane it has the form of a tubular member 16 to carry an inner vane 17 and comprises a shaft member 18 to carry an outer vane 19, said shaft member 18 being extended through the tubular member 16.

The inner ends of shaft members 16, 18 are entered within a fixed housing member 20 in which member 16 has a bearing, said member 16 being provided, within said housing member, with an operating lever 21 having a projecting pin 22 that engages a cam member 23 which is rotatably mounted on jacket 9, said cam member in its rotation thereby turning shaft member 16 and its vane 17 to open or close that portion of the inner passageway served thereby. The series of vanes 17 in passageway 11 are operated in unison.

The cam operating means comprise a shaft 24, journaled in fixed supports 25 and provided with a handle composed of a fixed section 26 and a tensionally releasable section 27 that, when released, is movable to rotate shaft 24 and to register its degree of rotation on a quadrant 28.

Shaft 24 is provided with a terminal, crank like portion 29 that is entered through an aperture 30 in cam 23, whereby rotation of shaft 24 causes the cam to shift lever 21 and thereby to rotate shaft member 16 and its vane 17. In practice the vanes 17 may be moved to a 60° opening, this providing a degree of vane angularity found desirable for the air moving through the inner passageway.

Another cam member 37 is adapted to engage a projecting pin 32 carried by a lever 33 which extends from the shaft 18, where said shaft extends beyond the tubular shaft member 16, this cam member 37, as actuated by the crank-like terminal portion of shaft 24, serving to rotate shaft 18 and its vane 19, to open or close said vane. The series of vanes 19 are all operated in unison and, in practice are moved to a full 90° opening, as providing a degree of vane opening found desirable for the air moving through the outer passageway, to be complementary with the maximum delivery of atomized liquid fuel from the burner.

It should be noted in the example illustrated that the cams 23 and 37 are so devised and arranged as to permit the vanes 19 to remain closed until the vanes 17 have been opened to their 60° open position indicated, and then further rotation of the shaft 24 will begin the opening of vanes 19 and continue their opening movement until they are open to their full set opening position of 90°, said vanes 19 having become angled oppositely to the angularity of the vanes 17. Stages between the closed position of vanes 19 and their position of opening at 90° will be indicated on the quadrant, in which positions the shaft will be releasably held by the tensionally controlled handle 27.

For a particular understanding of the cam members 23 and 37 reference should be had to Figs. 3, 4 and 5. Thus in these figures the cam slot 30 appears in full lines, being composed of the short and straight cam portion 34 which is succeeded by a concentric portion or dwell, whereby the vanes 17 which are turned toward the left by crank 29 operating in cam slot portion 34 in the rotation of shaft 24, caused by moving handle 27 away from the shut position, are enabled to direct the air which is permitted to flow through passageway 11 to move in a clockwise direction, in agreement with the same direction of air flow past the fixed vanes 14. The cam slot portion succeeding portion 34 is concentric as seen to correspond with the arc described by crank 29 in its continued movement, so that no further movement of vanes 17 occurs while crank 29 is following through said curved portion.

This idle curved slot portion 30 of cam member 23 is provided because the crank 29, in the rotation of shaft 24, is required also to turn the vanes 19 through their full range of 90°, but without at the same time imparting further movement to vanes 17, which latter reach their 60° of opening in the turning of crank 29 through cam slot portion 34 and the consequent rotation of cam 23.

As will be noted the crank 29 is entered in an aperture 35 in cam portion 31 of cam member 37, which may be called a right hand cam since its purpose as controlled by crank 29 is to move vanes 19 to the right for the purpose of permitting air flowing through passageway 12 to move in a counterclockwise direction, in agreement with the direction of air flow past fixed vanes 15.

In Fig. 3 crank 29 is shown at the root of both cam apertures, the vanes 17 and 19 all being closed. In Fig. 4 vanes 17 are shown open and vanes 19 still closed. Now, as crank 29 is turned to the position appearing in Fig. 4 crank 29 has travelled through the cam slot portion 34, moving vanes 17 to the open position. In this travel of crank 29 it has moved through a curved dwell portion 36 of the slot of cam member 37, the curvature whereof corresponds to the arc described by crank 29, thereby imparting no movement to shaft 18, and thus leaving vanes 19 closed. But in the continued rotation of shaft 24 crank 29 enters the straight or cam portion of slot 35 thus moving said cam and causing it to open the vanes 19 to the full open position (see Fig. 5) of 90° or to an intermediate position as determined by the operation of shaft 24.

In practice the extent of the cam portion 34 of slot 30 may be less by, for example, 10° than the extent of the curved portion 36 of the slot of cam 37, for the purpose of providing a lag or dead space in the movement of crank 29, after vanes 17 have been moved to their open position and before the vanes 19 commence their opening movement. There is provided an intermediate stop on the quadrant, indicating this position, which also may be used for maintaining the position permanently if desired.

Variations within the spirit and scope of my invention are equally comprehended by the foregoing disclosure.

I claim:

1. An air register for liquid fuel burners comprising means defining inner and outer coaxial passageways, separate sets of vanes pivoted in said passageways on radial axes, operating shafts for the outer set of vanes extending across the inner passageway, and means at the inner ends of said shafts and inner set of vanes for adjusting both sets of vanes about their axes and maintaining them in adjusted position.

2. An air register for liquid fuel burners comprising means defining inner and outer coaxial passageways, separate sets of vanes pivoted in said passageways, and a single operating means operable to swing the sets of vanes in opposite directions on their axes whereby to give opposite rotation to air flowing through the passageways.

3. An air register for liquid fuel burners comprising means defining inner and outer coaxial passageways, separate sets of vanes pivoted in said passageways, and a single operating means operable first to swing the vanes of the inner set in one direction and then to swing the vanes of the outer set in the opposite direction.

4. An air register for liquid fuel burners comprising means defining an annular passageway, fixed vanes angled in said passageway to give rotation to air flowing therethrough, vanes in said passageway pivoted to rotate about radial axes, and means for angling said pivoted vanes in consonance with the angling of the fixed vanes so as to impart rotation to the air in the same direction as the latter.

5. An air register for liquid fuel burners comprising means defining inner and outer coaxial passageways, fixed vanes oppositely angled in the respective passageways to give opposite rotation to air flowing through said passageways, separate sets of movable vanes in said passageways pivoted to rotate about radial axes, and means for oppositely angling the vanes of the two sets in consonance with the angling of the fixed vanes so as to impart rotation to the air in the same direction as the latter.

6. An air register for liquid fuel burners comprising means defining inner and outer coaxial passageways, pivotally mounted shafts extending radially across said passageways, vanes fixed on said shafts in the outer passageway, rotatable vanes coaxial with said shafts in the inner passageway, and means operable first to rotate the vanes of the inner set and then to oppositely rotate the vanes of the outer set.

7. An air register for liquid fuel burners comprising means defining inner and outer coaxial passageways, pivotally mounted shafts extending radially across said passageways, vanes fixed on said shafts in the outer passageway, rotatable vanes coaxial with said shafts in the inner passageway, and means operable first to rotate the vanes of the inner set and then to oppositely rotate the vanes of the outer set, said last named means including separately rotatable members having cam surfaces, and a crank pin cooperative with the cam surfaces of said members.

8. An air register for liquid fuel burners comprising means defining inner and outer coaxial passageways, rotatable shafts extending radially across said passageways, vanes fixed on said shafts in the outer passageway, vanes in the inner passageway pivoted to rotate about the axes of said shafts, and means at the inner ends of said shafts operable to rotate the vanes of each set in unison.

9. An air register for liquid fuel burners comprising means defining inner and outer coaxial passageways, separate sets of rotary vanes mounted in said passageways on radial axes, and means to rotate the vanes in the inner passageway in unison from closed position through a total angle of less than ninety degrees and then to rotate the vanes in the outer passageway in unison from closed position.

10. An air register for liquid fuel burners comprising means defining inner and outer coaxial passageways, separate sets of rotary vanes mounted in said passageways on radial axes, and means operable to rotate the vanes in the inner passageway in unison from closed position through a total angle of less than ninety degrees and then to oppositely rotate the vanes in the outer passageway in unison from closed position.

11. An air register for liquid fuel burners comprising means defining inner and outer coaxial passageways, rotatably mounted radial shafts extending across said passageways, vanes fixed on said shafts in the outer passageway, sleeves rotatable about the axes of said shafts and extending across the inner passageway, vanes fixed on said sleeves, separately rotatable members coaxially mounted relative to said passageways, motion transmitting means between one of said members and said shafts, motion transmitting means between the other of said members and said sleeves, and common means for rotating first one of said members and then the other.

12. An air register for liquid fuel burners comprising means defining inner and outer coaxial passageways, rotatably mounted radial shafts extending across said passageways, vanes fixed on said shafts in the outer passageway, sleeves rotatable about the axes of said shafts and extending across the inner passageway, vanes fixed on said sleeves, separately rotatable members coaxially mounted relative to said passageways, motion transmitting means between one of said members and said shafts, motion transmitting means between the other of said members and said sleeves, and common means operative for first rotating one of said members in one direction and then rotating the other member in the opposite direction.

13. An air register for liquid fuel burners comprising means defining inner and outer coaxial passageways, separate sets of vanes pivoted in said passageways, and operating means for said vanes comprising separately rotatable members coaxial with said passageways, said members having adjacent portions provided with cam slots, and a crank pin engaged in said slots, movement of said crank pin acting first on a cam portion of one slot and in a dwell of the other slot and then in a dwell of said one slot and on a cam portion of said other slot, the arrangement being such that one of said members is rotated while the other rests, and then said other member is oppositely rotated while said one of said members rests, transmission means between one of said members and one set of vanes, and transmission means between the other of said members and the other set of vanes, said transmission means acting to transmit movements of said members respectively to the vanes of said separate sets.

14. An air register for liquid fuel burners comprising means defining inner and outer coaxial passageways, pivotally mounted shafts extending radially across said passageways, vanes fixed on said shafts in the outer passageway, pivoted tubular members extending radially across the inner passageway, vanes fixed on said tubular members in the inner passageway, said shafts extending through said tubular members, and means at the inner ends of said shafts and tubular members for rotating the same and therewith the vanes.

GEORGE PERRY HAYNES.